(12) United States Patent
Anandappan et al.

(10) Patent No.: US 8,539,217 B2
(45) Date of Patent: Sep. 17, 2013

(54) METHOD AND SYSTEM TO FACILITATE DATA TRANSFER TO A DEVICE

(75) Inventors: Thanga Anandappan, Bangalore (IN); Balamurugan Manickam, Bangalore (IN); Hemanth R.S, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 721 days.

(21) Appl. No.: 12/692,756

(22) Filed: Jan. 25, 2010

(65) Prior Publication Data
US 2011/0185207 A1    Jul. 28, 2011

(51) Int. Cl.
*G06F 9/00*    (2006.01)

(52) U.S. Cl.
USPC .......................................................... 713/100

(58) Field of Classification Search
USPC ................................ 713/1, 2, 100; 701/3, 36
See application file for complete search history.

(56) References Cited

U.S. PATENT DOCUMENTS

| | | | |
|---|---|---|---|
| 5,706,239 A * | 1/1998 | Brys | ............................. 365/226 |
| 5,898,869 A | 4/1999 | Anderson | |
| 6,985,757 B2 | 1/2006 | Liu et al. | |
| 6,993,618 B2 * | 1/2006 | Chen et al. | .................... 710/305 |
| 7,010,651 B2 | 3/2006 | McGuffin | |
| 7,103,456 B2 | 9/2006 | Bloch et al. | |
| 7,489,992 B2 | 2/2009 | Valette et al. | |
| 7,512,714 B2 | 3/2009 | Eckert | |
| 2003/0003872 A1 * | 1/2003 | Brinkley et al. | ................ 455/66 |
| 2008/0039076 A1 | 2/2008 | Ziarno et al. | |
| 2009/0012674 A1 | 1/2009 | McGuffin et al. | |
| 2009/0051621 A1 * | 2/2009 | Liang et al. | ................... 343/906 |

\* cited by examiner

*Primary Examiner* — Paul Yanchus, III
(74) *Attorney, Agent, or Firm* — Fogg & Powers LLC

(57) ABSTRACT

A method to facilitate data transfer to a line replaceable unit that lacks a transmission control protocol/Internet protocol (TCP/IP) interface is provided. The method comprises interfacing a memory-processing card to the line replaceable unit. The memory-processing card includes a memory, a central processing unit module, an interface to the line replaceable unit, an interface to an access point communicatively coupled to the central processing unit module, and a bus arbitrator communicatively coupled to the memory, the central processing unit module, and the interfaces. The method also includes determining a state of the line replaceable unit at the bus arbitrator responsive to the interfacing, providing access at the bus arbitrator from the central processing unit module to the memory when the determined state of the line replaceable unit is OFF, and providing access at the bus arbitrator from the line replaceable unit to the memory when the determined state of the line replaceable unit is ON.

20 Claims, 5 Drawing Sheets

METHOD AND SYSTEM TO FACILITATE DATA TRANSFER TO A DEVICE

BACKGROUND

Using Internet service, it is possible for modern avionics that have a transmission control protocol/Internet protocol (TCP/IP) interface to download software or database directly to line replaceable units (LRU) from a remote server. However, traditional avionics and some traditional computing devices do not include the TCP/IP interface for such downloading so remote downloading becomes difficult and expensive. In legacy aircraft, data loading to avionics requires expensive manual operations, in which a technician goes to the aircraft and loads software or databases using either a personal computer memory card international association (PCMCIA) memory card or data CD through portable/installed disk drives. In order to avoid obsolescence, this operation is typically repeated at periodic intervals per the certification process defined for databases.

If the traditional avionics is migrated for TCP/IP interface, the equipment getting a new TCP/IP interface requires both hardware and software changes. Hardware may have to be upgraded with Ethernet ports and software needs to be upgraded to support TCP/IP protocol suite and software download modules. Such modifications require recertification of equipment, which is expensive.

In some avionic systems, data to be downloaded is routed through a communication management unit using existing Aeronautical Radio, Incorporated (ARINC) 429 connectivity between line replaceable units and the communication management unit, which have both been modified for software changes to accommodate the downloading. In some cases, there may not be direct ARINC 429 bus connectivity running from the communication management unit to the line replaceable units. Hence, this configuration can also require recertification of equipment.

SUMMARY

The present application relates to method to facilitate data transfer to a line replaceable unit that lacks a transmission control protocol/Internet protocol (TCP/IP) interface. The method comprises interfacing a memory-processing card to the line replaceable unit. The memory-processing card includes a memory, a central processing unit module, an interface to the line replaceable unit, an interface to an access point communicatively coupled to the central processing unit module, and a bus arbitrator communicatively coupled to the memory, the central processing unit module, and the interfaces. The method also includes determining a state of the line replaceable unit at the bus arbitrator responsive to the interfacing, providing access at the bus arbitrator from the central processing unit module to the memory when the determined state of the line replaceable unit is OFF, and providing access at the bus arbitrator from the line replaceable unit to the memory when the determined state of the line replaceable unit is ON.

DRAWINGS

Figure 4:
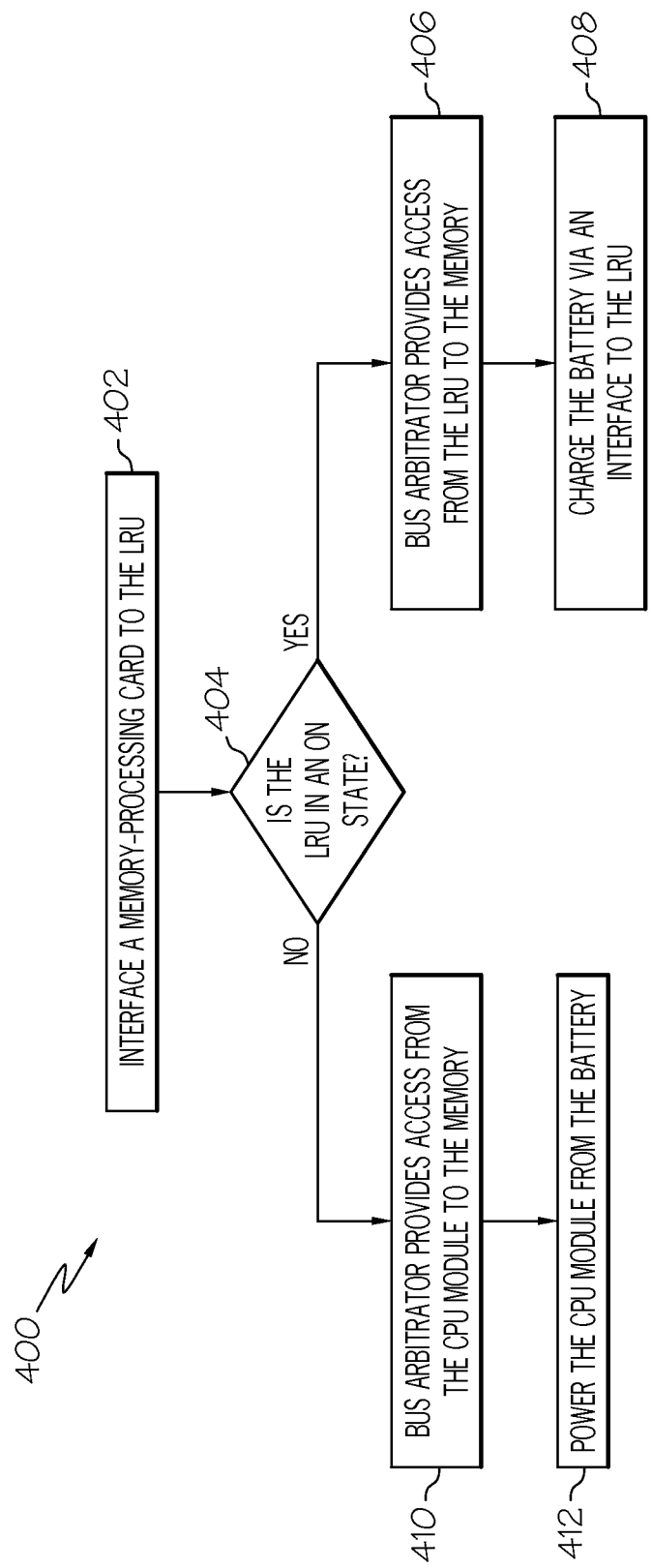
Figure 5:
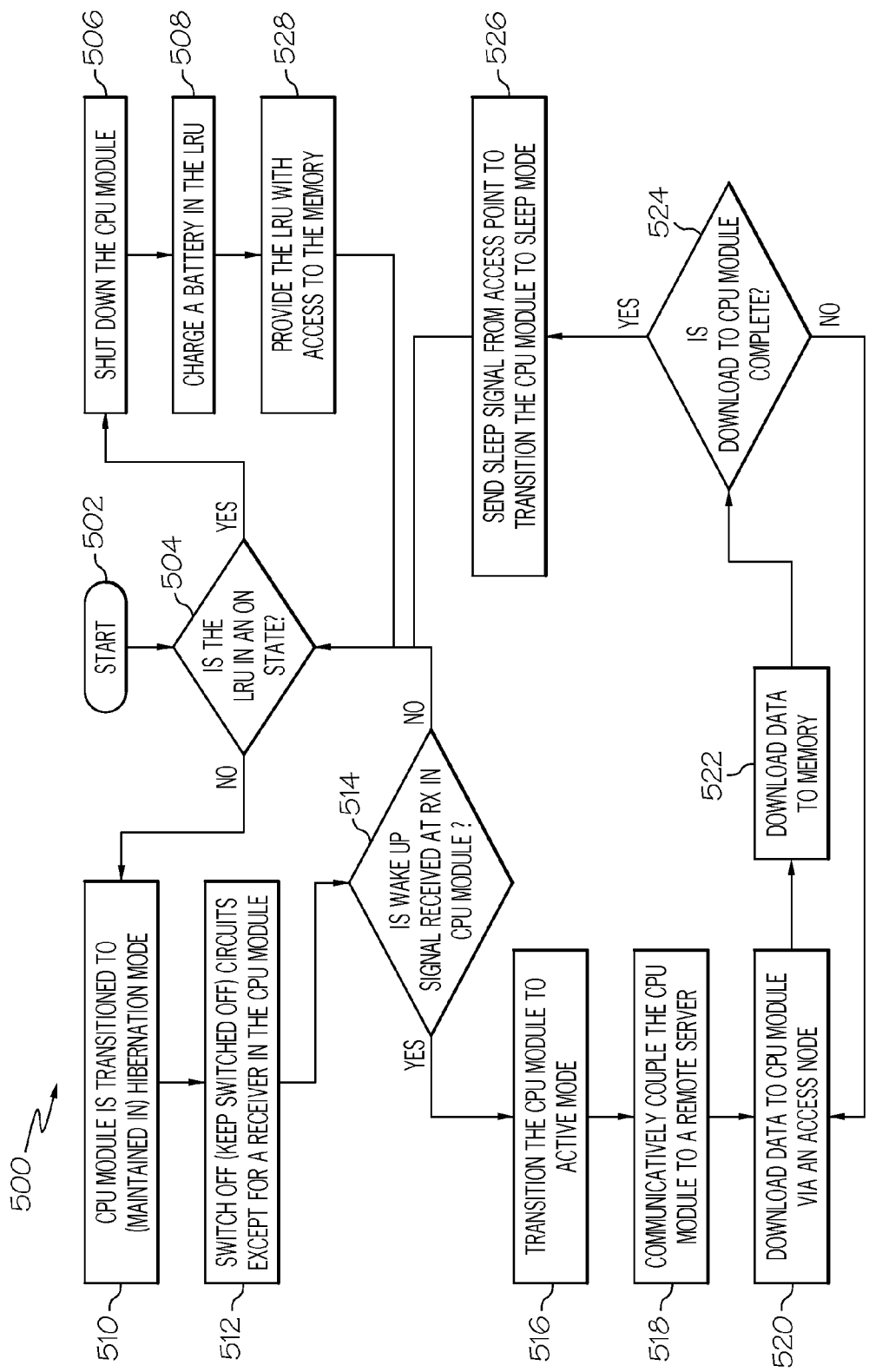

FIG. 4 is an embodiment of a method to facilitate data transfer to a line replaceable unit that lacks a transmission control protocol/Internet protocol (TCP/IP) interface in accordance with the present invention; and FIG. 5 is an embodiment of a method to facilitate data transfer to a line replaceable unit that lacks a transmission control protocol/Internet protocol (TCP/IP) interface in accordance with the present invention.

In accordance with common practice, the various described features are not drawn to scale but are drawn to emphasize features relevant to the present invention. Like reference characters denote like elements throughout figures and text.

DETAILED DESCRIPTION

Systems and methods for remote data loading of software or databases to legacy aircraft or legacy computing devices using an access point (e.g., Gatelink, broadband router, or local area network (LAN)) and a memory-processing card are described herein. These systems and methods do not require the above described manual procedures to download data from a remote server to the avionics on the legacy aircraft or to download data from the remote server to legacy computing devices. The memory-processing card provides data connectivity within an aircraft between LRUs and an access point (e.g., Gatelink, broadband router) using a WiFi interface or an Ethernet interface on the memory-processing card. Additionally, the memory-processing card provides data connectivity between computing devices and an access point (e.g., Gatelink, broadband router) using a WiFi interface or an Ethernet interface on the memory-processing card. In one implementation of this embodiment, the computing devices are in a vehicle.

The access point can make use of wireless interface for its communication with internet service provider (ISP). A central processing unit module in the memory-processing card handles processing of the downloaded data, independent of the line replaceable unit/computing device to which the memory-processing card is communicatively coupled. Data load operations occur when the line replaceable unit/computing device is powered down. Software required for these operations, such as TCP/IP protocol suite etc., are hosted in the internal central processing unit module. Using the memory-processing card, an access point downloads data directly to the memory without the knowledge of line replaceable unit/computing device so the download operations are completely transparent to line replaceable unit/computing device.

Thus, aircrafts with legacy line replaceable units that do not have a TCP/IP interface are able to receive the data downloaded from remote servers without an upgrade to the avionics. Since there is no modification required in the line replaceable unit to handle the download operations, there is no need to recertify the line replaceable units in order to perform the download operation. Likewise, the systems described herein eliminate the need for manually removing a memory card from a line replaceable unit in order to re-program it with newer versions of data.

Figure 1:
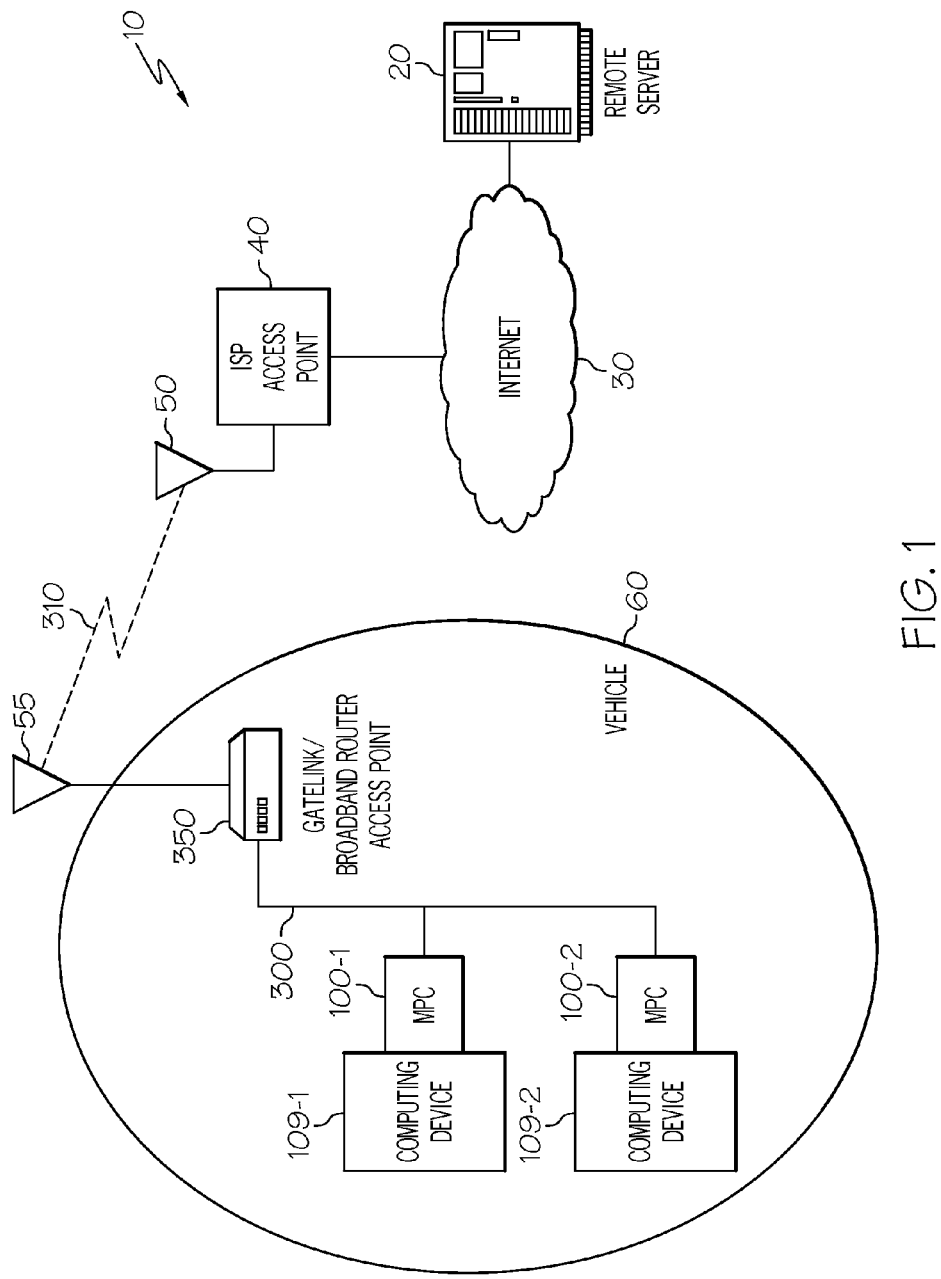
FIG. 1 is an embodiment of a system for transferring data from an access point to computing devices in accordance with the present invention.

FIG. 1 is an embodiment of a system 10 for transferring data from an access point 350 to computing devices 109(1-2) in accordance with the present invention. Two memory-processing cards 100(1-2) (MPC) are shown to be communicatively coupled to two respective computing devices 109(1-2)

although system 10 can include one memory-processing card 100 communicatively coupled to one computing device 109 or more than two memory-processing cards 100 communicatively coupled to more than two respective computing devices 109(1-N). The computing devices 109(1-2) lack a transmission control protocol/Internet protocol (TCP/IP) interface. The computing devices 109(1-2) include one or more electronic systems. The computing devices 109(1-2) are referred to herein as line computing device 109.

The system 10 includes a remote server 20, the Internet 30, an Internet service provide (ISP) access point 40, and a vehicle 60. The vehicle 60 includes memory-processing cards 100(1-2) communicatively coupling an access point 350 in the vehicle 60 to the respective traditional computing devices 109(1-2). In one implementation of this embodiment, the access point 350 is a broadband router 350. In another implementation of this embodiment, the access point 350 is a Gatelink 350. Therefore, the terms "Gatelink 350," "access point 350," and "broadband router 350" are interchangeably used herein. The vehicle 60 can be an aircraft or a water-based or land-based vehicle. In one implementation of this embodiment, the vehicle 60 is an aircraft 60 and the computing devices 109(1-2) are line replaceable units 109(2-1). Therefore, the terms "line replaceable unit" and "computing device" are interchangeably used herein. In yet another implementation of this embodiment, the memory-processing card 100-1 or 100-2 is a personal computer memory card international association (PCMCIA) memory card configured to mate with an interface in the computing device 109. In yet another implementation of this embodiment, the computing device 109 is not in a vehicle 60.

The memory-processing cards 100(1-2) are communicatively coupled to the access point 350 in the vehicle 60 via communication link 300. As shown in FIG. 1, the communication link 300 is a wired link, such as an Ethernet communication link. In one implementation of this embodiment, the communication link between the memory-processing card 100-1 or memory-processing card 100-2 and the access point 350 is a wireless communication link. The Gatelink 350 is communicatively coupled via a vehicle antenna 55, a wireless communication link 310, and an Internet service provider (ISP) antenna 50 to an ISP access point 40. The ISP access point 40 is communicatively coupled through the Internet 30 to a remote server 20. In this manner, the remote server 20 is communicatively coupled to enable a download of data to the computing device 109.

Figure 2:
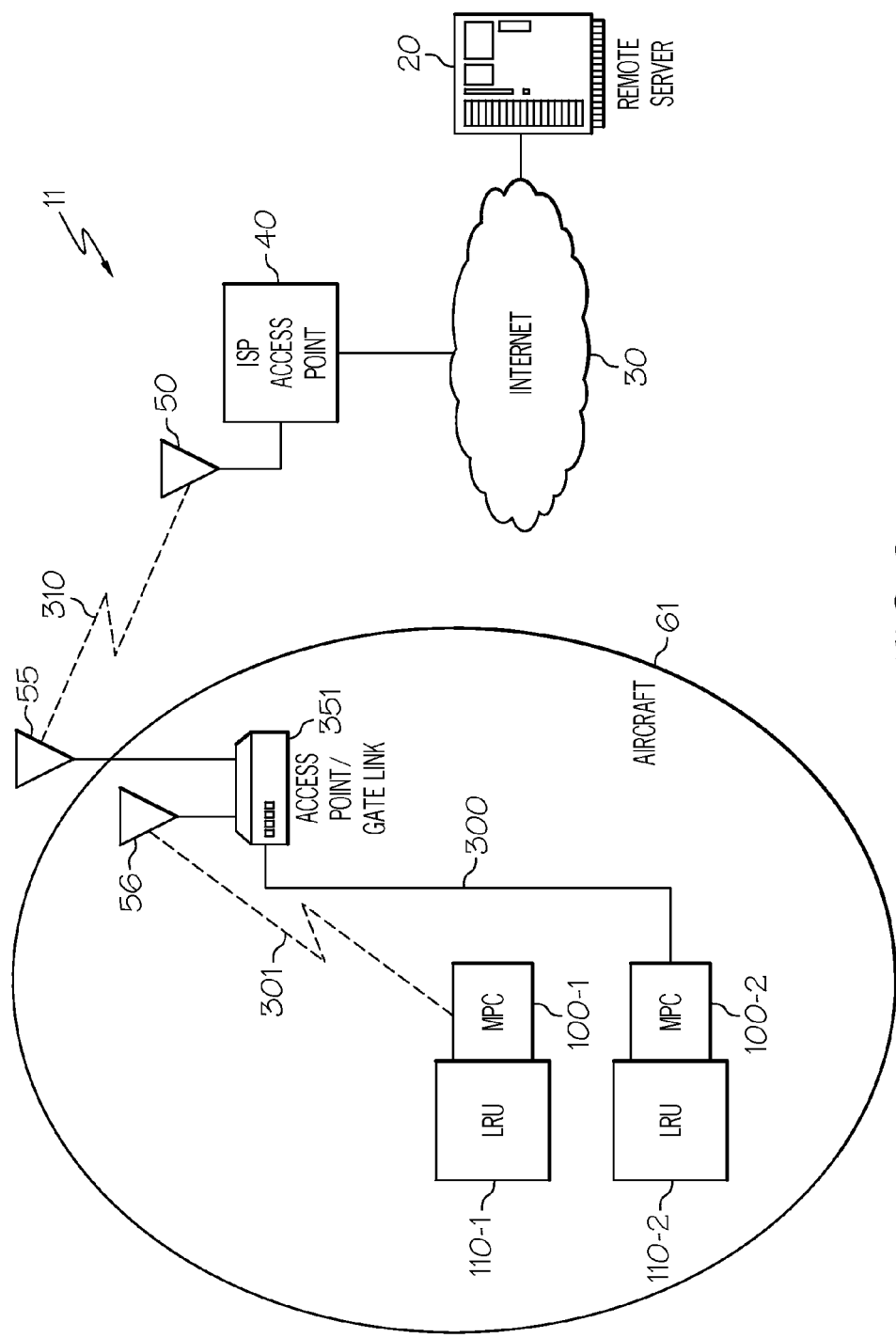
FIG. 2 is an embodiment of a system for transferring data from an access point to line replaceable units in accordance with the present invention.

FIG. 2 is an embodiment of a system 11 for transferring data from an access point/Gatelink 351 to line replaceable units 110(1-2) in accordance with the present invention. Two memory-processing cards 100(1-2) are shown to be communicatively coupled to two respective line replaceable units 110(1-2) although system 11 can include one memory-processing card 100 communicatively coupled to one line replaceable unit 110 or more than two memory-processing cards 100 communicatively coupled to more than two respective line replaceable units 110(1-N). The line replaceable unit 110(1-2) are legacy line replaceable units 110 and therefore lack a transmission control protocol/Internet protocol (TCP/IP) interface. The access point/Gatelink 351 is similar in function to the access point 350 described above with reference to FIG. 1. The line replaceable units 110(1-2) include avionics for the aircraft 61 in which the line replaceable units 110(1-2) are located. The line replaceable units 110(1-2) are referred to herein as line replaceable unit 110.

The access point 351 in the aircraft 61 is communicatively coupled to the memory-processing card 100-1 via antenna 56 and a wireless communication link 301. The memory-processing card 100-2 is also communicatively coupled to the access point 351 via a wired communication link 300. In one implementation of this embodiment, the access point 351 is a local area network (LAN) access point 351. In another implementation of this embodiment, the access point 351 is a Gatelink 351. In yet another implementation of this embodiment, the access point 351 is a broadband router 351. The access point 351 is communicatively coupled to the remote server 20 as described above with reference to system 10 in FIG. 1. In this manner, the remote server 20 is communicatively coupled to enable a download of data to the line replaceable unit 110.

Figure 3:
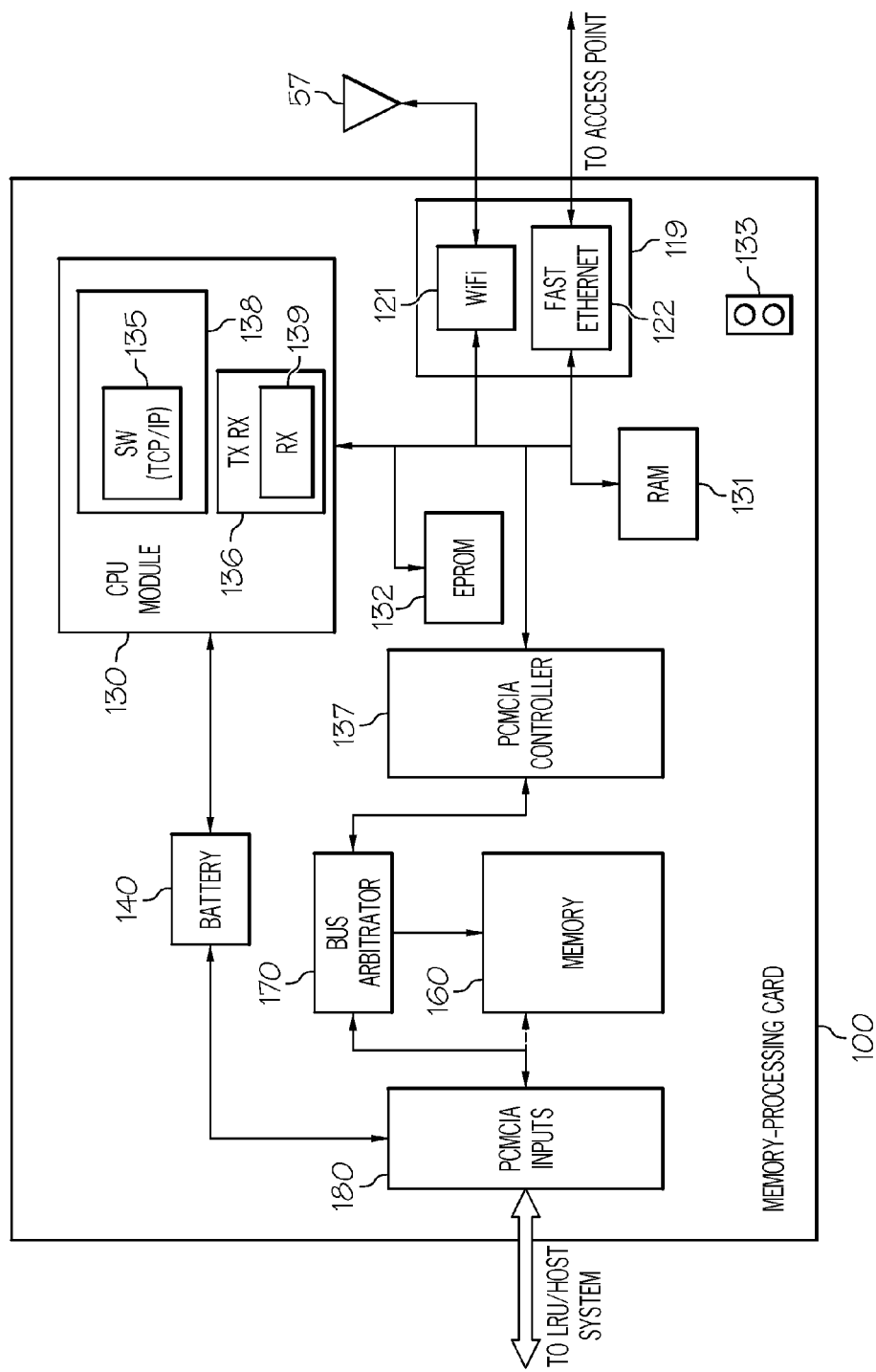
FIG. 3 is an embodiment of a memory-processing card for transferring data through an access point in accordance with the present invention.

FIG. 3 is an embodiment of a memory-processing card 100 for transferring data through an access point 350 in accordance with the present invention. The memory-processing card 100 is communicatively coupled to the computing device 109 (FIG. 1) or line replaceable unit 110 (FIG. 2) and the access point 350 or 351 (FIG. 1 or 2, respectively). The memory-processing card 100 includes an external-card interface 119 to the access point 350, a central processing unit (CPU) module 130, a memory 160, a bus arbitrator 170, a battery 140, and an interface 180 (shown as PCMCIA inputs) configured to mate with the computing device 109 (FIG. 1) or line replaceable unit 110 (FIG. 2).

The interface 180 is a computing-device interface 180 configured to mate with a personal computer memory card international association (PCMCIA) interface in the computing device 109 of the vehicle 60 when it is communicatively coupled to the computing device 109 as shown in FIG. 1. Likewise, the interface 180 is a line-replaceable-unit interface 180 configured to mate with a personal computer memory card international association (PCMCIA) interface in the line replaceable unit 110 when it is communicatively coupled to the line replaceable unit 110 in the aircraft 61 as shown in FIG. 2. In one implementation of this embodiment, the interface 180 is configured to transmit data according to the personal computer memory card international association (PCMCIA) standards.

The external-card interface 119 includes the WiFi port 121 and/or fast Ethernet port 122, which are referred to herein as ports 121 and 122. In one implementation of this embodiment, the external-card interface 119 is a wireless-service-unit interface, such as the WiFi port 121. In another implementation of this embodiment, the external-card interface 119 is a wired-service-unit interface, such as, the fast Ethernet port 122.

The bus arbitrator 170 allows either the line replaceable unit/computing device or the CPU module 130 to access the memory 160 at any given time as is described in detail below.

The central processing unit (CPU) module 130 is communicatively coupled to the bus arbitrator 170 via a PCMCIA controller 137. The central processing unit (CPU) module 130 is also communicatively coupled to the WiFi interface 121 and/or the fast Ethernet interface 122, and the battery 140. The central processing unit (CPU) module 130 is also communicatively coupled to other peripherals, such as, erasable programmable read-only memory (EPROM) 132 and/or random access memory (RAM) 131 as required for the operations of the CPU module 130. The CPU module 130 includes a transceiver 136 having a receiver 139 and hosts the software 135 required for its download operations of TCP/IP-based data packets in a storage medium 138. In one implementation of this embodiment, the software 135 features include light weight TCP/IP protocol, which is a reduced version of TCP/IP meant for small embedded systems, with an auto configuration option and a module for downloading data (either trivial file transfer protocol (TFTP) or file transfer protocol (FTP) or any proprietary protocol). CPU module 130 supports the ports 122 and 121 as well as status indicators 133, such as light emitting diodes (LEDs) for the ports 121 and 122.

The memory 160 is communicatively coupled to the bus arbitrator 170. The memory 160 is connected to the interface 180 after the bus arbitrator 170 sends a signal to allow that direct connection.

The battery 140 is communicatively coupled to provide power to the CPU module 130 when the line replaceable unit/computing device is powered down. In one implementation of this embodiment, the battery 140 is communicatively coupled to the line-replaceable-unit interface 180 so that the line replaceable unit 110 (FIG. 2) can charge the battery 140 when the line replaceable unit 110 is powered up. In another implementation of this embodiment, the battery 140 is communicatively coupled to the computing-device interface 180 so that the computing device 109 (FIG. 1) can charge the battery 140 when the computing device 109 is powered up.

The bus arbitrator 170 detects a state of the communicatively coupled unit, such as computing device 109 or line replaceable unit 110. The bus arbitrator 170 has the logic to detect the line replaceable unit's power ON/OFF status through a pin (VCC) on the line-replaceable-unit interface 180 (FIG. 2) The bus arbitrator 170 has the logic to detect the computing device's power ON/OFF status through a pin (VCC) on the computing-device interface 180 (FIG. 1).

The following discussion is presented with reference to system 11 in FIG. 2 for a line replaceable unit 110 in an aircraft 61. The discussion is also applicable to the computing device 109 in the vehicle 60 as is understandable to one skilled in the art upon reading this document. The CPU module 130 has two modes of operation, HIBERNATION mode and ACTIVE mode. When line replaceable unit 110 is shutdown, CPU module 130 automatically transitions to HIBERNATION mode. In HIBERNATION mode, the transmitter circuitry of the CPU module 130 is switched off while the receiver 139, which waits for a WAKE UP signal from Gatelink/access point 350 via the external-card interface 119 (e.g., ports 121 and 122). Once CPU module 130 receives a WAKE UP signal, it transitions to ACTIVE mode (also referred to as NORMAL mode). In the ACTIVE mode, circuitry of the CPU module 130 is active and the CPU module 130 is able to send/receive data packets, including TCP/IP-based data packets. After download operations are completed, Gatelink/access point 350 (FIG. 1) terminates the ACTIVE mode of the CPU module 130 by sending a SLEEP signal to the CPU module 130. When CPU module 130 receives the SLEEP signal while in ACTIVE mode, it transitions to HIBERNATION mode. When line replaceable unit 110 is powered up, CPU module 130 shuts down and does not accept signals even at the receiver 139. The bus arbitrator 170 has the logic to detect the computing device's power change in status from OFF to ON status through a pin (VCC) on the computing-device interface 180 (FIG. 1) and to shut down the CPU module 130 responsive to that change in status.

In one implementation of this embodiment, the signals sent between the Gatelink/access point 350 and the CPU module 130 are proprietary messages defined between the Gatelink/access point 350 and CPU module 130. In another implementation of this embodiment, the line-replaceable-unit interface 180 of memory-processing card 100 fits into an existing PCMCIA slot in the line replaceable unit 110. In yet another implementation of this embodiment, the memory-processing card 100 is an extended component outside the line replaceable unit 110. Other memory-processing card/line-replaceable-unit interface configurations are possible.

FIG. 4 is an embodiment of a method 400 to facilitate data transfer to a line replaceable unit 110 that lacks a transmission control protocol/Internet protocol (TCP/IP) interface in accordance with the present invention. Method 400 is described with reference to system 11 of FIG. 2 and the configuration of the memory-processing card 100 of FIG. 3. Other embodiments of method 400 are possible as is understandable to one skilled in the art upon reading this document.

At block 402, a memory-processing card is interfaced to the line replaceable unit 110. In embodiments, the memory-processing card is the memory-processing card 100 shown in FIG. 3. At block 404, a state of the line replaceable unit 110 is determined by the bus arbitrator 170 in the memory-processing card 100.

If the line replaceable unit 110 is in the ON state, the flow proceeds to block 406. At block 406, the bus arbitrator 170 provides access from the line replaceable unit 110 (FIG. 1) to the memory 160 (FIG. 3) when the determined state of the line replaceable unit 110 is ON. The access to memory 160 is provided via pins on the PCMCIA Inputs 180 (FIG. 3). At this time, the CPU module 130 does not have access to the memory 160. At block 408, the battery 140 in the memory-processing card 100 is charged via the interface 180 to the line replaceable unit 110. A pin on the PCMCIA inputs 180 (FIG. 3) is used to provide the power to the battery 140.

If the line replaceable unit 110 is in the OFF state, the flow proceeds from block 404 to block 410. At block 410, the bus arbitrator 170 provides access from the CPU module 130 (FIG. 3) to the memory 160 (FIG. 3) when the determined state of the line replaceable unit 110 is OFF. The access to memory 160 is provided via the PCMCIA controller 137 (FIG. 3). At this time, the line replaceable unit 110 does not have access to the memory 160. At block 412, the CPU module 130 is powered from the battery 140 in the memory-processing card 100 when the determined state of the line replaceable unit 110 is OFF.

FIG. 5 is an embodiment of a method 500 to facilitate data transfer to a line replaceable 110 that lacks a transmission control protocol/Internet protocol (TCP/IP) interface in accordance with the present invention. Method 500 is described with reference to system 11 of FIG. 2 and the configuration of the memory-processing card 100 of FIG. 3. Other embodiments of method 500 are possible as is understandable to one skilled in the art upon reading this document.

The process starts at block 502. A state of the line replaceable unit 110 is determined by the bus arbitrator 170 in the memory-processing card (block 504). If the line replaceable unit is in the ON state, the flow proceeds to block 506. The bus arbitrator 170 signals the CPU module 130 to shut down (block 506). Responsive to receiving the signal from the CPU module 130, the circuits within the CPU module 130, including the receiver 139 in the transceiver 136, shut down and the CPU module is unable to accept signals from the external-card interface 119 to the access point 351. The battery 140 in the memory-processing card 100 is charged via the interface to the line replaceable unit 180 (block 508).

If the line replaceable unit 110 is in the OFF state, the flow proceeds from block 504 to block 510. The bus arbitrator 170 sends a signal to the CPU module 130 to transition the CPU module 130 to HIBERNATION mode (block 510). When the CPU module 130 transitions to HIBERNATION mode, the circuits in the CPU module 130, except for the receiver 139, shut down (block 512). The receiver 139 remains active and waits to receive a WAKE UP signal from the access point 350 (FIG. 1) (block 514). While a WAKE UP signal is not received at the receiver 139 of the CPU module 130 and while the line replaceable unit 110 remains in an OFF state, the receiver 139 remains active and continues to wait for a WAKE UP signal.

When the receiver 139 receives a WAKE UP signal, the flow proceeds from block 514 to block 516. At block 516, the CPU module 130 transitions to ACTIVE mode. At block 518, the CPU module 130 is communicatively coupled to a remote server 20 (FIG. 1) via the access point 350 responsive to receiving the WAKE UP signal.

The remote server 20 downloads data to the CPU module 130 in the memory-processing card 100 via the access point 350 (block 520). The CPU module 130 receives Internet protocol (IP) data packets from the remote server 20 via the Internet 30, the ISP access point 40, communication link 310, antenna 55, and the access point 350. The CPU module 130 implements the software 135 stored in a storage medium 138 of the CPU module 130 to receive the IP data packets. The software 135 enables the CPU module 130 to receive and process the IP data packets. The CPU module 130 downloads the data received from the remote server 20 to the memory 160 (block 522).

The access point 350 monitors the downloading from the remote server 20 (block 524). When the access point 350 recognizes that the downloading of data from the remote server 20 is complete, the access point 350 sends a SLEEP signal to CPU module 130 (block 526). The CPU module 130 transitions to HIBERNATION mode (block 510) responsive to receiving the SLEEP signal from the access point 350 if the line replaceable unit 110 is still in the OFF state (block 504). The next time the line replaceable unit 110 is powered up, the bus arbitrator 170 provides the line replaceable unit 110 with access to the memory 160 (block 528). In this manner, the line replaceable unit 110 is able to access and download the data that was downloaded to the memory 160 from the remote server 20 at block 522. Thus, a line replaceable unit 110 (or computing device 109) that is not configured with a TCP/IP/IP interface is able to receive data from a remote server 20 via the Internet 30 without being upgraded and recertified.

Thus, dataloading is implemented to the various types of line replaceable units including but not limited to communication management unit (CMU); File Management System (FMS); Enhanced Ground-Proximity Warning System (EG-PWS); and Information System Services (ISS) without modifying them. The dataloading is completely automated without need for manual intervention. In addition, data uploading can also be performed through the same channels in the same manner that some of the line replaceable units use PCMCIA memory card for storing its traces. Likewise, the system and methods described herein can also be used in test setups for remote data loading.

Additionally, the systems and methods described herein do not present electromagnetic compatibility/electromagnetic interference (EMC/EMI) challenges to the line replaceable unit/computing devices, since the CPU module in the memory-processing card is active when the line replaceable unit/computing devices are switched off. The CPU module in the memory-processing card is switched off when the aircraft 61 is airborne.

Although specific embodiments have been illustrated and described herein, it will be appreciated by those skilled in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to facilitate data transfer to a line replaceable unit that lacks a transmission control protocol/Internet protocol (TCP/IP) interface, the method comprising:
   interfacing a memory-processing card to the line replaceable unit, the memory-processing card including;
      a memory,
      a central processing unit module,
      an interface to the line replaceable unit,
      an external-card interface to an access point communicatively coupled to the central processing unit module, and
      a bus arbitrator operable to determine an ON/OFF state of the interfaced line replaceable unit, the bus arbitrator communicatively coupled to the memory, the central processing unit module, and the interfaces;
   determining a state of the line replaceable unit responsive to the interfacing;
   providing the central processing unit module with access to the memory when the determined state of the line replaceable unit is OFF; and
   providing the line replaceable unit with access to the memory when the determined state of the line replaceable unit is ON.

2. The method of claim 1, further comprising:
   charging a battery in the memory-processing card via the interface to the line replaceable unit when the determined state of the line replaceable unit is ON; and
   powering the central processing unit module from the battery in the memory-processing card when the determined state of the line replaceable unit is OFF.

3. The method of claim 1, wherein providing the central processing unit module with access to the memory comprises transitioning the central processing unit module to HIBERNATION mode.

4. The method of claim 3, wherein transitioning the central processing unit module to HIBERNATION mode comprises:
   switching off all circuits in the central processing unit module except for a receiver in the central processing unit module; and
   waiting to receive a WAKE UP signal sent from an access point at the receiver in the central processing unit module.

5. The method of claim 4, further comprising:
   transitioning the central processing unit module to ACTIVE mode when a WAKE UP signal is received at the receiver.

6. The method of claim 5, further comprising:
   communicatively coupling the central processing unit module to a remote server via the access point responsive to receiving the WAKE UP signal; and
   downloading data to the memory from the remote server via the access point.

7. The method of claim 6, further comprising:
   sending a SLEEP signal from the access point to the central processing unit module responsive to completing the downloading of data from the remote server; and
   transitioning the central processing unit module to HIBERNATION mode responsive to receiving the SLEEP signal from the access point if the line replaceable unit is still in the OFF state.

8. The method of claim 1, further comprising:
   shutting down the central processing unit module when the line replaceable unit is powered up, wherein the central processing unit module is unable to accept signals.

9. The method of claim 1, wherein providing the line replaceable unit with access to the memory when the determined state of the line replaceable unit is ON comprises shutting down the central processing unit module, wherein the central processing unit module is unable to accept signals from the external-card interface to the access point.

10. A memory-processing card for transferring data from a remote server to a computing device that lacks a transmission control protocol/Internet protocol (TCP/IP) interface, the memory-processing card comprising:
 a computing-device interface configured to mate with an interface in the computing device;
 an external-card interface to an access point;
 a bus arbitrator to determine an ON/OFF state of the interfaced computing device;
 a memory communicatively coupled to the bus arbitrator; and
 a central processing unit module communicatively coupled to the external-card interface, wherein the central processing unit module has access to the memory when the determined state of the computing device is, and
 wherein the computing device has access to the memory when the determined state of the computing device is ON.

11. The memory-processing card of claim 10, further comprising a battery wherein the battery is charged via the computing-device interface when the determined state of the computing device is ON, and wherein the central processing unit module is powered from the battery when the determined state of the computing device is OFF.

12. The memory-processing card of claim 10, wherein the external-card interface includes at least one of a WiFi port and an Ethernet port.

13. The memory-processing card of claim 10, wherein the central processing unit module includes:
 software configured for transmission control protocol/Internet protocol; and
 a receiver to receive a WAKE UP signal when the central processing unit module is in a HIBERNATION mode.

14. The memory-processing card of claim 10, wherein the computing device is a line replaceable unit in an aircraft.

15. The memory-processing card of claim 10, wherein the computing-device interface is a personal computer memory card international association (PCMCIA) interface.

16. A system to facilitate data transfer to a line replaceable unit that lacks a transmission control protocol/Internet protocol interface, the system comprising:
 the line replaceable unit;
 a memory-processing card communicatively coupled to the line replaceable unit; and
 an access point communicatively coupled to the memory-processing card, wherein data from a remote server is downloaded to the memory-processing card when the memory-processing card determines the line replaceable unit is powered down.

17. The system of claim 16, wherein the memory-processing card comprises:
 an external-card interface to the access point;
 a bus arbitrator to determine a state of the line replaceable unit;
 a memory communicatively coupled to the bus arbitrator;
 a central processing unit module communicatively coupled to the external-card interface, wherein the central processing unit module has access to the memory when the determined state of the line replaceable unit is OFF; and
 a line-replaceable-unit interface configured to mate with an interface in the line replaceable unit, wherein the line replaceable unit has access to the memory when the determined state of the line replaceable unit is ON.

18. The memory-processing card of claim 17, wherein the external-card interface includes at least one of a WiFi port and an Ethernet port.

19. The system of claim 17, wherein the memory-processing card further comprises a battery wherein the battery is charged via the line-replaceable-unit interface when the determined state of the line replaceable unit is ON, and wherein the central processing unit module is powered from the battery when the determined state of the line replaceable unit is OFF.

20. The memory-processing card of claim 17, wherein the central processing unit module includes:
 software configured for transmission control protocol/Internet protocol; and
 a receiver to receive a WAKE UP signal when the central processing unit module is in a HIBERNATION mode.

* * * * *

UNITED STATES PATENT AND TRADEMARK OFFICE
CERTIFICATE OF CORRECTION

PATENT NO.         : 8,539,217 B2                                    Page 1 of 1
APPLICATION NO.    : 12/692756
DATED              : September 17, 2013
INVENTOR(S)        : Anandappan et al.

It is certified that error appears in the above-identified patent and that said Letters Patent is hereby corrected as shown below:

In the Claims

At Column 9, Line 19, Claim 10, replace "device is, and" with --device is OFF, and--

Signed and Sealed this
Twenty-seventh Day of May, 2014

Michelle K. Lee
*Deputy Director of the United States Patent and Trademark Office*